(12) United States Patent
Hackney

(10) Patent No.: US 9,114,734 B2
(45) Date of Patent: Aug. 25, 2015

(54) COLLECTION BIN FOR AUTOMOBILE SEAT POCKET

(71) Applicant: Mervyn G. Hackney, Oklahoma City, OK (US)

(72) Inventor: Mervyn G. Hackney, Oklahoma City, OK (US)

( * ) Notice: Subject to any disclaimer, the term of this patent is extended or adjusted under 35 U.S.C. 154(b) by 0 days.

(21) Appl. No.: 13/919,505

(22) Filed: Jun. 17, 2013

(65) Prior Publication Data
US 2014/0368005 A1 Dec. 18, 2014

(51) Int. Cl.
*B60N 3/08* (2006.01)

(52) U.S. Cl.
CPC .......................................... *B60N 3/08* (2013.01)

(58) Field of Classification Search
CPC .............. B60R 7/00; B60R 7/043; B60R 7/04
USPC ...................... 224/275, 482, 483; 297/188.04; 264/242
See application file for complete search history.

(56) References Cited

U.S. PATENT DOCUMENTS

| | | | |
|---|---|---|---|
| 1,486,566 A | 3/1924 | Crecelius | |
| 1,606,944 A | 11/1926 | Johnson | |
| 2,778,553 A | 1/1957 | Satrom | |
| 2,778,554 A * | 1/1957 | Porkola | 224/553 |
| 2,925,172 A | 2/1960 | Hopp | |
| 2,971,688 A * | 2/1961 | Akers | 229/126 |
| 3,004,655 A * | 10/1961 | Whitnack | 224/483 |
| 3,125,212 A | 3/1964 | Gerber | |
| 3,403,830 A | 10/1968 | Jones et al. | |
| 3,497,119 A * | 2/1970 | Beeck | 224/275 |
| 3,598,297 A | 8/1971 | Welch | |
| 3,632,029 A | 1/1972 | Sonner | |
| 3,690,446 A | 9/1972 | Spainhour et al. | |
| 4,083,313 A | 4/1978 | Borreson | |
| 4,154,383 A | 5/1979 | Honatzis | |
| 4,360,106 A * | 11/1982 | Irvine et al. | 229/212 |
| 5,031,808 A * | 7/1991 | Dolenc | 224/482 |
| 5,170,903 A * | 12/1992 | Fleming | 220/87.2 |
| 5,226,576 A | 7/1993 | Ellsworth | |
| 5,246,190 A | 9/1993 | Swirkal | |
| 5,253,791 A * | 10/1993 | Chiodo | 224/275 |

(Continued)

FOREIGN PATENT DOCUMENTS

| | | |
|---|---|---|
| EP | 1409288 | 4/2004 |
| FR | 1182600 A | 6/1959 |
| GB | 1345182 | 1/1974 |

OTHER PUBLICATIONS

4wheelparts; "Seat Storage Bag"; retrieved on Jun. 10, 2013 from http://www.4wheelparts.com/Interior-Parts-Accessories/Seat-Storage-Bag.

(Continued)

*Primary Examiner* — Justin Larson
*Assistant Examiner* — Lester L Vanterpool
(74) *Attorney, Agent, or Firm* — Robert H. Frantz

(57) ABSTRACT

A collection bin for use in a vehicle has a body defining an interior space and an opening top rim, the rim being substantially rigid so as remain open without force to overcome a closure, and having a hanging flap attached to an edge of the opening rim which depends towards a bottom of the body such that the hanging flap can be received in a seat back pocket of a vehicle seat, wherein the hanging flap attachment is substantially along the full length of an edge of the opening rim. Optionally, the hanging flap may depend a full depth of the body, and may have break-way sections to shorten it.

14 Claims, 4 Drawing Sheets

(56) References Cited

U.S. PATENT DOCUMENTS

| | | | |
|---|---|---|---|
| 5,362,153 A | 11/1994 | Lu | |
| 5,490,623 A | 2/1996 | McConnell | |
| 5,683,019 A * | 11/1997 | Schaber | 224/191 |
| 5,868,294 A | 2/1999 | Webster | |
| 5,897,208 A | 4/1999 | Tokuda | |
| 6,095,477 A * | 8/2000 | Pohlman | 248/452 |
| 6,105,839 A | 8/2000 | Bell | |
| 6,149,229 A | 11/2000 | Dillon, Jr. et al. | |
| 6,626,337 B1 | 9/2003 | Cox | |
| 6,726,076 B1 * | 4/2004 | Hernandez | 224/675 |
| 7,028,872 B2 | 4/2006 | Lobanoff | |
| 7,770,952 B2 | 8/2010 | Hanzel | |
| 8,376,200 B2 | 2/2013 | Kim | |
| 2003/0111499 A1 * | 6/2003 | French et al. | 224/275 |
| 2008/0128460 A1 | 6/2008 | Adler et al. | |
| 2010/0155445 A1 | 6/2010 | Kim | |

OTHER PUBLICATIONS

JZSInternational; "2009-2010 Toyota Prius Rear Multi Box Gray Japan JDM"; retrieved on Jun. 10, 2013 from http://www.jzsinternational.com/servlet/the-1237/2009-2010-TOYOTA- . . . 1.

Rediff; "Universal Car Auto Dustbin 2 Way Open Trash Can"; retrieved on Jun. 10, 2013 from http://shopping.rediff.com/product/universal-car-auto-dustbin-2-way-open.

AliExpress; "Car Storage Bags alibaba express storage bins"; retrieved on Jun. 10, 2013 from http://www.aliexpress.com/item-img/Car-Storage-Bags/514665174.html.

HouseholdManagement101; "Car Trash Can: Over the Seat Garbage Bin"; retrieved on Jun. 10, 2013 from http://www.household-management-101.com/car-trash-can-over-the-seat- . . . 1.

Carbag;"The Mobile Trash Bin"; retrieved on Jun. 10, 2013 from http://www.car-bag.com/en/products/carbag/.

CruiseMotorSports; "Hip Pcoket-Great Storage or Trash Container, 01-05"; retrieved on Jun. 10, 2013 from http://www.cruisermotorsports.com/InteriorAccessories.html.

Carbag;"The mobile Trash Bin"; retrieved on Jun. 10, 2013.

J&DHomeware; "Trash Pocket"; retrieved on Jun. 10, 2013 from http://www.doc-organizer.com/product.php?name=20121123140255.

Orgjunkie; "Vehicle Storage and How I'm Making it Work"; retrieved on Jun. 10, 2013 from http://orgjunkie.com/2011/04/vehicle-storage-how-im-making-it-work.html.

* cited by examiner

COLLECTION BIN FOR AUTOMOBILE SEAT POCKET

FIELD OF THE INVENTION

The invention generally relates to trash, refuse, and collection bins for use in automobiles on a pocket on a seat back.

BACKGROUND OF INVENTION

There is a common need to collect of trash, refuse, and even children's toys in an automobile, sports utility vehicle (SUV), pickup truck, minivan, van, airplane or train. Many collection bins available in the art attach to a door side pocket, to the slot for a window in a door, to the glove compartment door, and especially to the vertical supports for a headrest portion of the seat. Some are formed out of bags, some with pleats for expansion, while some also provide a frame to hold a bag into a specific shape.

SUMMARY OF EXEMPLARY EMBODIMENTS OF THE INVENTION

A collection bin for use in a vehicle has a body defining an interior space and an opening top rim, the rim being substantially rigid so as remain open without force to overcome a closure, and having a hanging flap attached to an edge of the opening rim which depends towards a bottom of the body such that the hanging flap can be received in a seat back pocket of a vehicle seat, wherein the hanging flap attachment is substantially along the full length of an edge of the opening rim. Optionally, the hanging flap may depend a full depth of the body, and may have break-way sections to shorten it.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

The inventor of the present invention has realized several problems with the existing collection bins and bags sin the art:
(a) those which attach to a window raising and lowering handle are not useful in a growing number of vehicles which have power windows and do not have the proper attachment point;
(b) those which attach to a slot for the window in the top of a door place the bin or bag at a point which may interfere with the movement of the driver's or passenger's arm and elbow, especially when full;
(c) versions which attach to a glove compartment door may not be useful in some vehicles in which the glove compartment door is on a declining slope underneath the dashboard, and may interfere with passenger airbag deployment in some configurations; and
(d) variations of bins and bags which attach to vertical supports for headrests are not useful for vehicles in which the seats have headrests integrally formed with the lower back portion of the seat.

The present inventor has realized that the seat back pocket is nearly ubiquitous in today's vehicle designs, especially in SUV's where seats are more upright in configuration. However, one problem to be solved with using a seat back pocket for collection of toys, trash and other items is that if it is overstuffed, it may stretch out and ruin the elasticity of the pocket, causing it to permanently sag. Another problem is that the collection of wet items, such as soda cans and drink cups, can allow liquids to leak into the pocket and cause it to stain or become sticky. Another problem is that most seat back pockets have an elastic or spring-biased closure which is difficult to overcome to place an item in the pocket single handedly.

Some vehicle accessories which attach to a seat back pocket place considerable weight on the top edge of the pocket, which places a continuous weight load on the elastic cord sewn into the top edge of the pocket and can cause it to stretch and sag.

Therefore, the present inventor set out to develop a collection bin for attachment to a vehicle seat back pocket which does not allow liquids to soil the pocket, which is capable of receiving a large soda can or drink up without requiring stretching open a closure, and which does not place an inordinate amount of weight on the top edge of the pocket so as to avoid damage to the elastic or spring component of the pocket.

Further, in at least one embodiment, the bin is provided with an area or zone in which an automobile manufacturer, dealer, or retailer may place within the area a logo, badge or other type of affinity marking.

For the purposes of this disclosure, we will refer to automobile seat back pockets. But, it will be readily recognized by those skilled in the art that other modes of transportation which also provide seat back pockets may benefit from the present invention, including but not limited to airliners, trains, ferries, and buses.

An Exemplary Embodiment

Figure 1A:
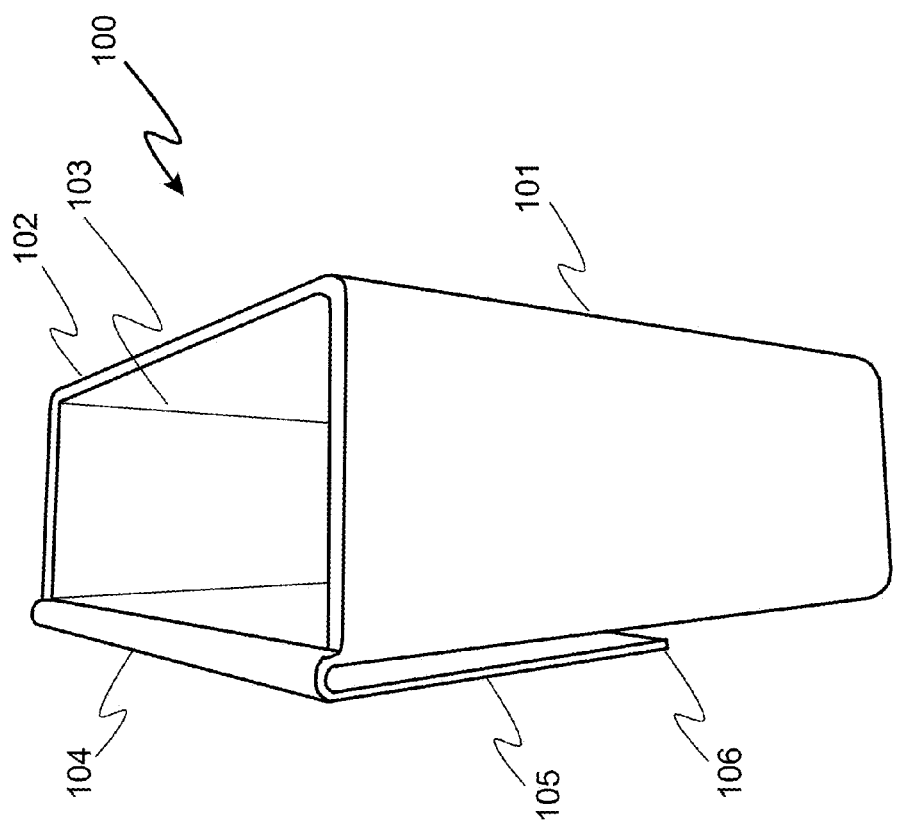
FIGS. 1a and 1b illustrate a side view of a bin according to the present invention.

Referring now to FIG. 1a, a side view exemplary embodiment (100) of a prototype according to the present invention is shown. The bin has a body portion (101) which is in the form of a generally closed container having a left side (shown), a right side, a bottom portion, a front side, and a back side, and having an rim (102) providing an opening for access to an interior volume (103) formed by the sides, bottom, front and top, in which toys, trash, and refuse may be collected.

The exemplary embodiment (100) is provided with a hanging flap (105) which is attached (104) across the top edge of the back side, and depends towards the bottom portion to a lower extent (106).

Figure 2:
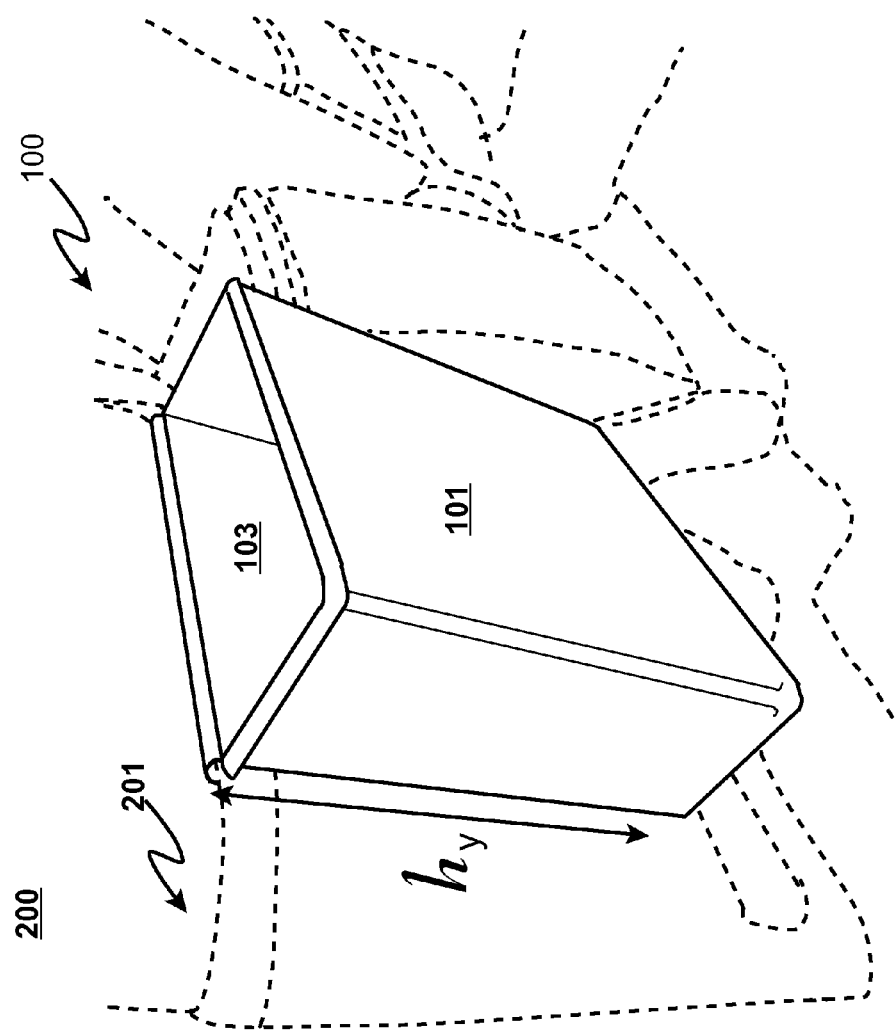
FIG. 2 illustrates the installation of the embodiment of FIGS. 1a and 1b into a seatback pocket in a vehicle.

The bin (100) is installed into a seat back pocket (200) as shown in FIG. 2, such that the hanging flap (hidden from this view) is received into the seat back pocket. As can be seen of this prototype embodiment, the opening (103) is preferably rigidly held open to provide access to the interior volume of the body portion (101) to facilitate single-handed placing of large beverage bottles and cups into the bin.

Figure 1B:
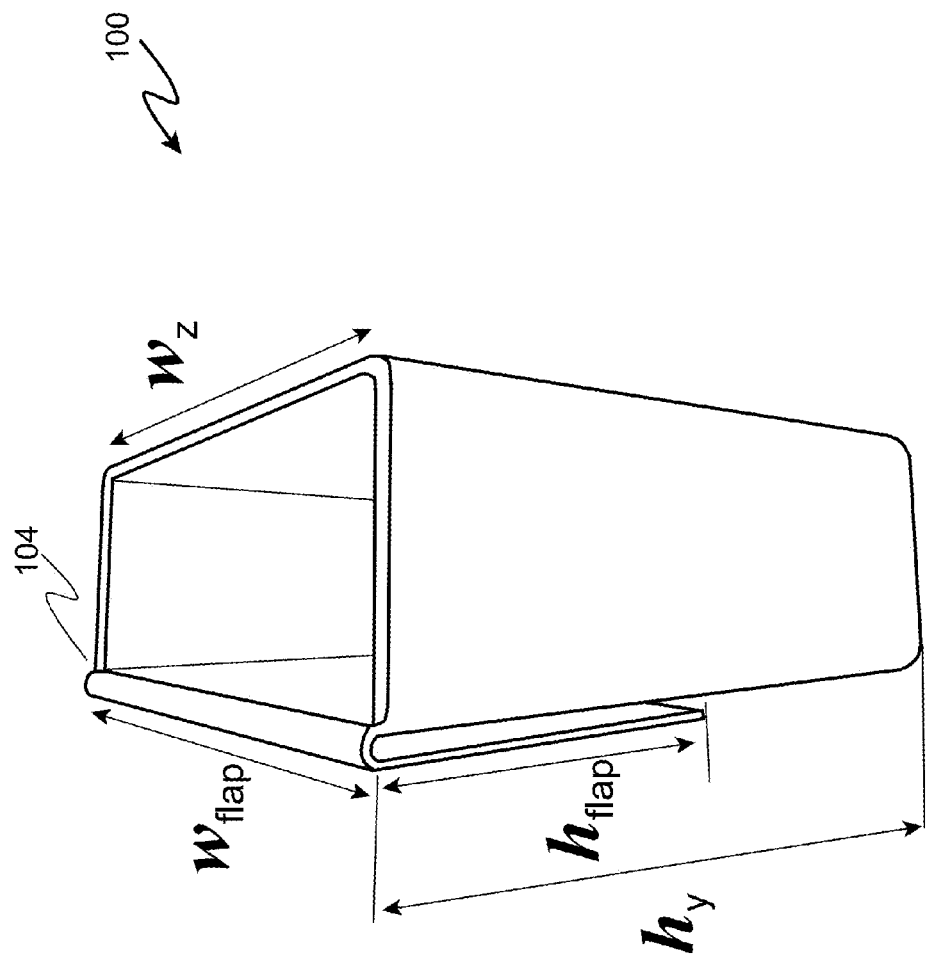

Referring to FIG. 1b, which is the same view of an exemplary embodiment (100) as shown in FIG. 1a with additional markings for reference to the structural components. The width $w_z$ of the bin is substantially equal to the width $w_{flap}$ of the attachment (104) of the hanging flap (105) to promote side-to-side stability of the bin such that, when it is loaded with contents, it sways less during motion of the vehicle in which it is installed. The depth $w_x$ of the bin (100) will be discussed in following paragraphs.

Further, the height $h_{flap}$ of the hanging flap (105) may be, but is not necessarily, substantially equal to the height $h_y$ of the back side of the bin. When it is substantially equal, then the bottom edge of the handing flap may reach the bottom of a seat back bottom, thereby providing support for the weight of the bin and its contents, and relieving the top edge of the seat back pocket from supporting the entire weight of the bin and contents.

Figure 3:
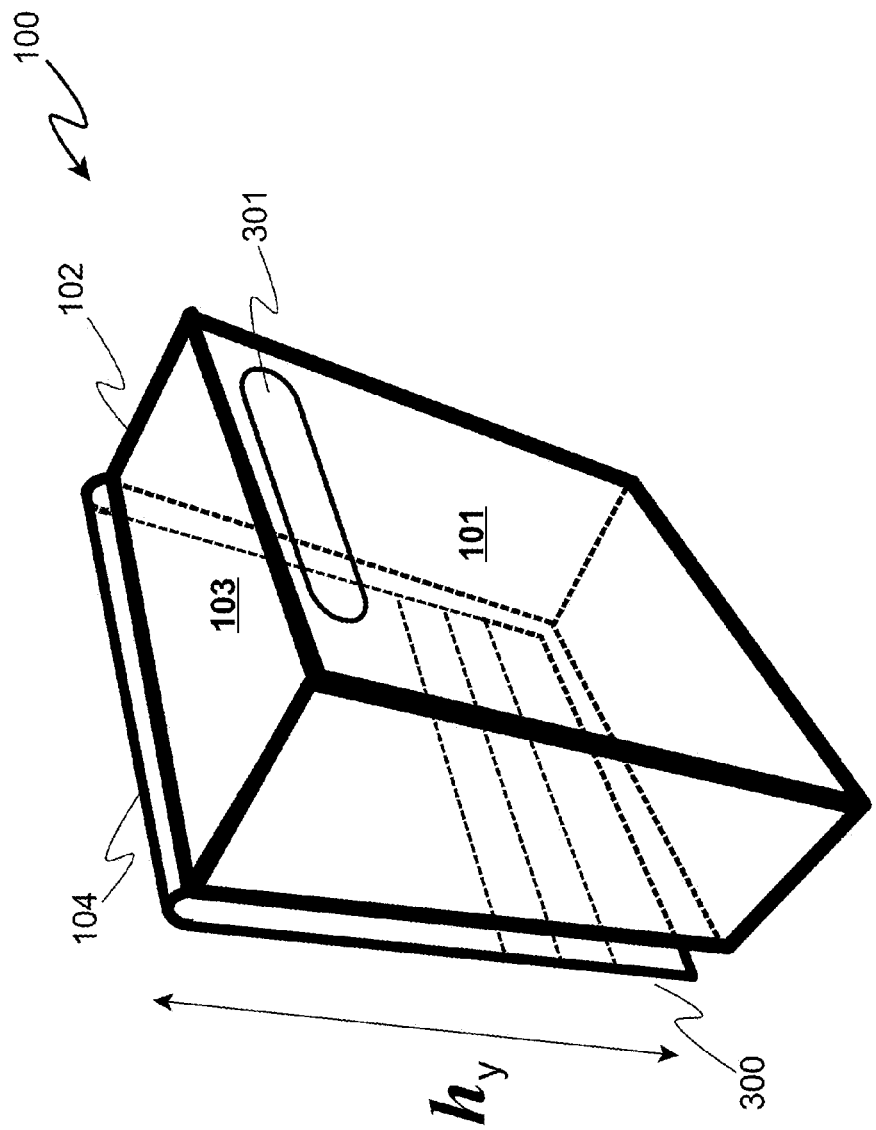
FIG. 3 sets forth an embodiment of the bin of FIGS. 1a and 1b in which hidden features are illustrated.

Referring now to FIG. 3, an outline drawing of such an embodiment is shown in which hidden features are shown in dashed lines. Further, two additional optional features (300, 301) are illustrated. First, the hanging flap (105) is provided with one or more removable tab portions (300) towards the bottom of the flap, which are removable to adjust height the hanging flap. Such tabs could be pre-scored to allow an end-user to break off one or more tabs to shorten the depth which the hanging flap reaches from the attachment (104) to the back side of the bin.

A second feature of a preferred embodiment is a formed area (301) in which an affinity logo or badge may be printed, labeled, or affixed, such as an automobile dealer badge, an automobile manufacturer badge, or a retailer logo. This area (301) may be formed by embossing, debossing, holes or cleats for snapping in a logoed component, or similar structural element.

Dimensions of a Preferred Embodiment

According to the present inventor's research, common large bottles and cups have a diameter of approximately 4.25 inches, so at least one preferred embodiment of the bin (100) is to provide opening (103) dimensions $4.0"\leq w_x \leq w_z$ which at least meets or exceeds this diameter of large beverage containers. With the bin being formed from a substantially rigid material so that it remains open at the top without need to stretch or pull it open, a user may single-handedly place a large drink container into the bin (100) easily and conveniently.

Conclusion

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A bin for collection of articles in a vehicle comprising:
   a body defining an interior space and having a top end, a closed bottom end separated from the top end by a body height, and a top rear edge, the top end being held open by a rim thereby allowing reception of contents without force by a user to open the top end; and
   a weight-supporting flap having a bottom edge and being attached to and depending from the top rear edge of the body protruding downward a predetermined distance towards the bottom end of the body such that the supporting flap is received in a seat back pocket of a vehicle seat, capturing a pocket flap between the weight-supporting flap and the body;
   wherein the predetermined distance comprises a depth of the seat back pocket as measured from a top edge of the pocket flap to a pocket bottom formed between the pocket flap and the vehicle seat, wherein the supporting flap bottom edge contacts the pocket bottom bearing weight of the bin, thereby and relieving weight-bearing stress from the pocket flap.

2. The bin as set forth in claim 1 wherein the supporting flap is attached along a full length of the top rear edge of the top end.

3. The bin as set forth in claim 1 wherein the supporting flap depends substantially the body height.

4. The bin as set forth in claim 1 wherein the supporting flap depends beyond the body height.

5. The bin as set forth in claim 1 wherein the supporting flap is provided with one or more removable sections to shorten the supporting flap to match a shallower depth of a seat back pocket.

6. The bin as set forth in claim 5 wherein the removable section comprises a break-away section.

7. The bin as set forth in claim 1 in which the rim defines an opening of at least 4 inches in diameter.

8. A method for manufacturing a bin for collection of articles in a vehicle comprising:
   forming a body having interior space and a top end, a closed bottom end separated from the top end by a body height, and a top rear edge, the top end being held open by a rim thereby allowing reception of contents without force by a user to open the top end; and
   providing a weight-supporting flap having a bottom edge and being attached to and depending from the top rear edge of the body protruding downward a predetermined distance towards the bottom end of the body such that the supporting flap is received in a seat back pocket of a vehicle seat, capturing a pocket flap between the weight-supporting flap and the body;
   wherein the predetermined distance comprises a depth of the seat back pocket as measured from a top edge of the pocket flap to a pocket bottom formed between the pocket flap and the vehicle seat, wherein the supporting flap bottom edge contacts the pocket bottom bearing weight of the bin, thereby relieving weight-bearing stress from the pocket flap.

9. The method as set forth in claim 8 wherein the providing of a supporting flap comprises attaching a flap along a full length of the top rear edge.

10. The method as set forth in claim 8 wherein providing a of a supporting flap comprises providing a flap which depends substantially the body height.

11. The method as set forth in claim 8 wherein the supporting flap depends beyond the body height.

12. The method as set forth in claim 8 wherein the providing of a supporting flap comprises providing one or more removable sections to the flap to selectably shorten the flap to match a shallower depth of a seat back pocket.

13. The method as set forth in claim 12 wherein the removable section comprises a break-away section.

14. The method as set forth in claim 8 in which the forming of a rim comprises forming a rim having an opening of at least 4 inches in diameter.

\* \* \* \* \*